United States Patent [19]

Maebashi

[11] Patent Number: 5,400,755
[45] Date of Patent: Mar. 28, 1995

[54] COMBUSTION CONTROL SYSTEM FOR IN-CYLINDER INJECTION TYPE TWO-CYCLE ENGINE

[75] Inventor: Kosei Maebashi, Iwata, Japan

[73] Assignee: Yamaha Hatsudoki Kabushiki Kaisha, Iwata, Japan

[21] Appl. No.: 176,327

[22] Filed: Jan. 3, 1994

Related U.S. Application Data

[62] Division of Ser. No. 950,799, Sep. 24, 1992, Pat. No. 5,322,044.

[30] Foreign Application Priority Data

Sep. 27, 1991 [JP] Japan .................................. 3-277176

[51] Int. Cl.⁶ ............................................. F02D 41/16
[52] U.S. Cl. .................................................. 123/339
[58] Field of Search ......................................... 123/339

[56] References Cited

U.S. PATENT DOCUMENTS

| | | |
|---|---|---|
| 4,291,656 | 9/1981 | Miyagi et al. ............. 123/339 X |
| 4,474,153 | 10/1984 | Hanamoto et al. ............. 123/339 |
| 4,827,885 | 5/1989 | Nishikawa et al. ............. 123/339 |
| 4,926,806 | 5/1990 | Ahern et al. ............. 123/491 X |
| 5,020,504 | 6/1991 | Morikawa ............. 123/531 |
| 5,074,271 | 12/1991 | Suzuki et al. ............. 123/491 |
| 5,190,006 | 4/1993 | Motoyama et al. ............. 123/305 |
| 5,205,255 | 4/1993 | Yamagata et al. ............. 123/331 |

*Primary Examiner*—Tony M. Argenbright
*Attorney, Agent, or Firm*—Knobbe, Martens, Olson & Bear

[57] ABSTRACT

The fuel injected two-cycle internal combustion engine having an exhaust control valve and direct cylinder injection. The fuel injection timing and duration are increased at starting over idle and the exhaust control valve, which is normally closed at idle and opened at high speed is moved to its high speed condition during starting to assist in starting. In addition, when the engine is returned to an idle condition after racing, the engine idle speed is reduced in steps to prevent stalling and improve return to idle.

7 Claims, 5 Drawing Sheets

COMBUSTION CONTROL SYSTEM FOR IN-CYLINDER INJECTION TYPE TWO-CYCLE ENGINE

This application is a divisional of application Ser. No. 07/950,799, filed Sep. 24, 1992, now U.S. Pat. No. 5,322,044.

BACKGROUND OF THE INVENTION

This invention relates to a combustion control system for an in-cylinder injection type of two-cycle engine and more particularly to an improved fuel injection system for an internal combustion engine and method for operating a fuel injection system for an engine.

In fuel injected internal combustion engines the injection strategy employed during starting is substantially the same as that during idle. That is, the fuel injection timing and duration during starting are generally the same as the injection timing and duration during idle. However, starting provides a different type of running characteristic than idle and the use of conventional injection techniques that employ the same fuel injection strategy for starting as at idle do not offer good starting characteristics. This is particularly true with two-cycle internal combustion engines.

As a basic reason why the same injection strategies do not offer good starting, there are certain characteristics of the engine that occur at starting which are true at idle. For example, when running at idle, generally the fuel injection is concluded at a very short time period before ignition occurs so as to insure that there will be a stoichiometric mixture present at the gap of the spark plug at the time of firing. However, during starting such retarded injection timing does not permit adequate fuel vaporization within the cylinder so as to insure combustion when the spark plug fires. Also, when injecting the fuel at a retarded period during starting, the fuel injection occurs at a time when the compression pressure is relatively high and the amount of fuel injected for a given time of opening of the injection valve may be reduced from that which occurs at idle operation.

It is, therefore, a principal object of this invention to provide an improved fuel injection system and method of operating a fuel injected engine that facilitates starting.

It is a further object of this invention to provide an improved starting fuel injection system and method of operation for a two-cycle internal combustion engine.

In conjunction with two-cycle internal combustion engines, it has also been proposed to provide an exhaust control valve which effectively changes the timing of opening and closing of the exhaust port while the engine is running. This permits the attainment of a high compression ratio to provide good fuel economy and emission control under low-and mid-range conditions and a reduced effective compression ratio under high speed running so as to avoid overheating and overloading of the engine. The exhaust control valve is positioned in its compression ratio raising position when in the idle operation. However, this gives rise to starting problems.

It is, therefore, a still further object of this invention to provide an improved two-cycle engine exhaust control valve and operating system which will improve the starting of the engine without adversely affecting the performance of the engine under other running conditions.

There is another running condition of the engine which can also give rise to certain problems. This occurs when the engine is run at a rapid rate of speed that exceeds the normal speed at which the associated vehicle is being operated. This is a so called "racing engine" mode which commonly occurs. However, if the engine throttle valve is moved quickly to the idle position and the fuel control for the engine is also moved quickly to the idle condition, then uneven running and, in extreme cases, stalling may be encountered.

It is, therefore, a further object of this invention to provide an improved engine control which permits the engine to return to idle after a racing mode condition without stalling.

SUMMARY OF THE INVENTION

Two features of the invention are adapted to be embodied in internal combustion engines and methods of operating such engines which include a combustion chamber and a fuel injector that sprays fuel directly into the combustion cheer. In addition, means are provided for starting the engine. The fuel injector is controlled by a control means that provides a specific control of the fuel injection under all running conditions.

In accordance with a first feature of the invention, the fuel injection control is operated so as to advance the timing of beginning of fuel injection when the engine is being started from that injection timing which is set for the idle condition of the engine.

In accordance with another feature of the invention, the injection control extends the duration of fuel injection under starting from that duration of fuel injection which is employed at idle.

Another feature of the invention is adapted to be embodied in a two cycle internal combustion engine having an exhaust port that is opened and closed by relative movement of two components of the engine. An exhaust timing control valve is provided for adjusting the timing of opening and closing of the exhaust pert so as to change the effective compression ratio of the engine. Under normal running conditions, the exhaust port timing is retarded at a idle and low speed conditions to provide a raised effective compression ratio and is opened under high speed running conditions to provide a reduced effective compression ratio. Means are also provided for starting of the engine. In accordance with this feature of the invention, the exhaust control valve is moved to its open position for reducing the effective compression ratio from that at idle during starting operation.

A still further feature of the invention is adapted to be embodied in an engine control and a method for controlling the running of an internal combustion engine having a throttle for varying the speed at which the engine operates. Means are also provided for setting the idle speed of the engine at a predetermined value. In accordance with this feature of the invention, when the throttle control is moved from a racing condition to an idle condition, the idle speed of the engine is reduced in steps to the normal idle speed so as to prevent stalling or uneven running.

DETAILED DESCRIPTION OF THE PREFERRED EMBODIMENTS OF THE INVENTION

Figure 1:
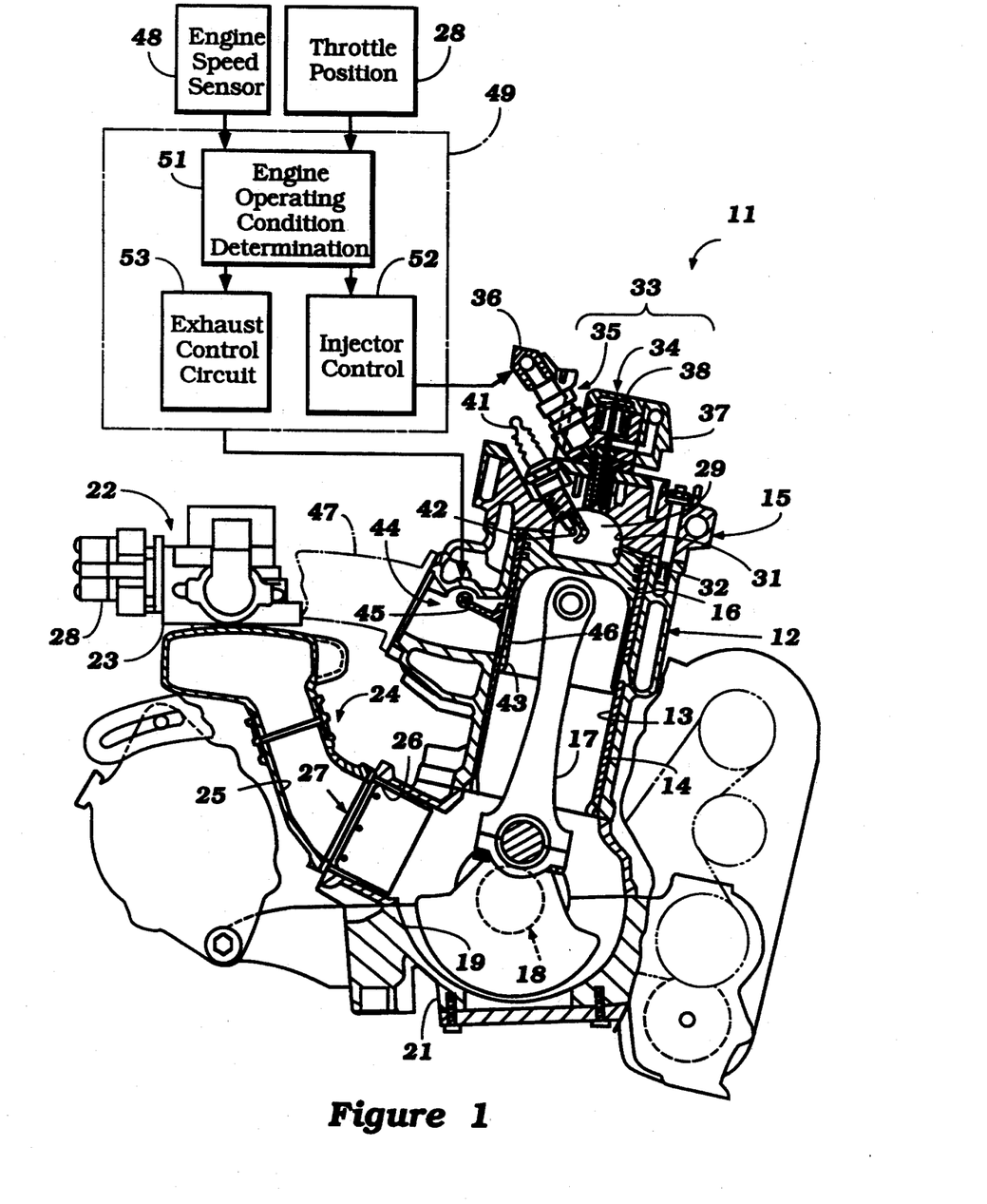
FIG. 1 is a partially schematic cross sectional view taken through a single cylinder of a multi-cylinder, inline type of reciprocating engine constructed and operating in accordance with an embodiment of the invention.

Referring now in detail to the drawings and initially to FIG. 1, a two-cycle, direct cylinder, fuel injected engine constructed in accordance with an embodiment of the invention is identified generally by the reference numeral 11. The engine 11 is, in the illustrated embodiment of the three-cylinder inline type. Although the invention is described in conjunction with such an engine, it should be readily apparent to those skilled in the art that certain facets of the engine can be employed with other types of engines than those operating on a two-cycle principal, other than reciprocating engines and also engines having other cylinder numbers and types. Since it is believed that those skilled in the art can readily understand how the invention can be practiced with multiple cylinder or multiple chamber engines, only a single cylinder of the engine has been depicted. Where any details of the engine and/or the components associated with it are not fully described herein reference may be had to U.S. Pat. No. 5,113,829 issued May 19, 1992, entitled Two-Cycle Internal Combustion Engine, assigned to the Assignee hereof for the details of the construction. That patent is, therefore, incorporated herein by reference.

The engine 11 includes a cylinder block, indicated generally by the reference numeral 12 that is formed with one or more cylinder bores 13 by means of pressed or cast-in cylinder liners 14. A cylinder head assembly 15 is affixed to the cylinder block 12 in a known manner and closes the upper end of the cylinder bores 13. Pistons 16 are supported for reciprocation in each cylinder bore 13 and are connected by means of connecting rods 17 to the individual throws of a crankshaft, indicated generally by the reference numeral 18. The crankshaft 18 is rotatably supported within a crankcase 19 formed by the skirt of the cylinder block 12 and a crankcase member 21 which is affixed to the cylinder block 12 in any known manner. As is typical with two-cycle crankcase compression type of engines, the individual crankcase chambers 19 associated with each cylinder bore 13 are sealed from each other in any appropriate manner.

An air charge is delivered to the crankcase chambers 19 from the atmosphere through an induction system, indicated generally by the reference numeral 22. This induction system includes a throttle body 23 that contains a throttle valve (not shown) and which draws atmospheric air through a suitable air cleaner and silencer assembly (not shown). This air charge is then delivered to an intake manifold, indicated generally by the reference numeral 24 and which has a common inlet that is served by the throttle body 23 and a plurality of individual runners 25 that communicate with intake ports 26 formed in a side of the crankcase member 21. Reed type check valves 27 are positioned in the intake ports 26 so as to permit a charge to be drawn into the crankcase chambers 19 as the pistons 16 move upwardly and to preclude escape of the compressed charge back into the induction system 22 when the pistons 16 move downwardly to compress the charge.

A throttle position sensor 28 is mounted on the throttle body 23 for providing a signal indicative of the position of the throttle valve, to implement the control strategy to be hereinafter described.

The air charge which has been drawn into the crankcase chambers 19 during the upward movement of the pistons 16 is compressed upon downward movement of the pistons 16 and then is transferred to a combustion chamber, indicated generally by the reference numeral 29 and which is formed in part by a recess 31 in the cylinder head assembly 15 and a recess 32 formed in the head of the pistons 16. Any suitable scavenge passage arrangement may be employed for so transferring the charge.

A fuel/air injector system, indicated generally by the reference numeral 33 is mounted in the cylinder head assembly 15 for delivering a source of fuel under pressure and also compressed air to the combustion chamber 29. The fuel/air injector 33 includes a main body assembly 34 which defines a chamber to which fuel is supplied by a fuel injector 35. The fuel injector 35 is of the electronic type and receives fuel under regulated pressure through a fuel manifold 36.

In addition, compressed air is supplied to this chamber from an air manifold 37. The air/fuel-injector 33 also includes an injection valve which opens and closes the communication of the aforenoted chamber to which the fuel and compressed air is supplied and which is operated by an electronic solenoid 38. The construction of the fuel/air injector 33 may be of any known type and, in accordance with some features of the invention, the injector 33 may inject only fuel rather than fuel and air. Reference may be had to application entitled "Fuel Injection System Including Supplemental Fuel Injector", Ser. No. 591,957, filed Oct. 2, 1990 in the name of Uyu Motoyama, now U.S. Pat. No. 5,136,990, issued Aug. 11, 1992 and assigned to the Assignee hereof for a disclosure of a specific type of air/fuel injector which may be employed in conjunction with the invention.

The fuel/air charge introduced into the combustion chamber 29 is then fired at an appropriate interval by firing spark plugs 41 having spark gaps 42 that extend into the combustion chamber 29 and which are fired by a suitable ignition circuit.

The burning of the gases causes the propagation of rapid flame front in the combustion chamber and expansion of the gases to drive the pistons 16 downwardly. At an appropriate time, an exhaust port 43 formed in the cylinder liner 14 and which communicates with an exhaust passage 44 in the cylinder block 12 will open. In accordance with a feature of the invention, an exhaust control valve 45 having a valving portion 46 operates to adjust the timing of the opening and closing of the exhaust so as to adjust the effective compression ratio of the engine.

Basically, the system operates so that the exhaust control valve 45 is positioned in a closed position as shown in FIG. 1, wherein the timing of opening and closing are, respectively, retarded and advanced so as to decrease the duration of opening of the exhaust passage 44 under low and mid-range performance to provide an effective increase in compression ratio. However, as the speed and load on the engine 11 increase, the exhaust control valves 45 are moved to their opened, compression ratio lowering position wherein the timing of opening of the exhaust passage 44 is advanced and the timing of closing of the exhaust passage is retarded so as to provide better scavenging and reduce the compression ratio under high speed high load conditions.

The exhaust gases then flow from the exhaust passages 44 into an exhaust system, shown partially in phantom and identified by the reference numeral 47 for discharge to the atmosphere in a well known manner.

Basically the construction of the engine 11 as thus far described may be considered to be generally conventional and reference may be had to the aforenoted two patents for details of the construction which have not been shown and described. The invention deals with the sequence under which the fuel injector 33 injects, particularly under starting, the sequence under which the exhaust control valve 45 is operated under starting in relation to main running and the way in which the engine is returned to its idle condition. The control for accomplishing these things is provided by certain sensors and specifically the throttle position sensor 28 and an engine speed sensor 48 which outputs signals to a control unit, shown schematically by the block 49.

The control unit 49 includes an engine operating condition discriminator 51 which is preprogrammed to determine the engine running mode or condition from the input signals of the throttle position sensor 28 and engine speed sensor 48. This outputs control signals to an ignition circuit (not shown) for controlling the timing of firing of the spark plugs 41, a fuel injection control sensor 52 that controls the electronic fuel injector 35 as to both injection timing and duration and which also controls the solenoid 38 for controlling the main injection valve timing and duration. In addition, the engine operating condition discriminator 51 controls an exhaust control valve circuit 53 which controls the operation of a stepping motor for controlling the position of the exhaust control valves 45.

Basically, the control operates so as to control the amount of fuel injected, the timing of the opening of the injector valve of the air/fuel injector 33, the timing of firing of the spark plug 41 and the opening and closing of the exhaust control valve 45 in response to the sensed conditions during engine operation. Basically the operation is such that under idle the exhaust control valves 45 are left in their closed position wherein timing of opening and closing of the exhaust port is retarded as shown best in FIG. 3 and wherein fuel is injected and the injection control valve of the air/fuel injector 33 is opened and closed immediately before the firing of the spark plug 41. This will insure that there is a stoichiometric charge present at the spark gap 42 at the time the spark plug 41 is fired. As the speed and load of the engine increase, the timing and duration of fuel injection and opening of the injection valve of the fuel/air injector 33 are adjusted so as to provide more fuel and a change in the timing of injection as well as a timing of the firing of the spark plug 41. Also, as the load and speed of the engine move into the high speed high load range, the exhaust control valve 45 is moved to its opened position so as to reduce the effective compression ratio during these running conditions, for the reasons aforenoted.

One important phase of the operation is the control strategy during starting. Most engines conventionally position the exhaust control valve and the timing and duration of the fuel injection the same as at starting as at idle. This can give rise to starting difficulties for a variety of reasons, many of which have been noted.

For example, the fuel vaporization may be reduced at starting and, therefore, there may not be a stoichiometric mixture present at the spark gap 42 at the time of firing. In addition, the compression ratio is too high for effective starting. In accordance with the invention, therefore, the duration of fuel injection by the fuel injector 36 is increased in response to real time during the starting operation. Although the time of injection is increased during starting, since the engine is running at a lower speed during starting, the actual crank angle for starting time may be substantially the same as seen by comparing FIGS. 2 and 3. However, the injector valve of the fuel/air injector is opened and closed at a much advanced state from that at normal idle as may be also seen by comparing FIGS. 2 and 3. Thus, the fuel injection will penetrate more deeply into the combustion chamber and will be present at a longer time period so as to improve vaporization. The deeper penetration is possible because of the fact that the injection is into a lower pressure area because of the advance in timing. Although cranking speed is something less than one-third of normal idle speed, the extension of real time duration is less than the ratio of the cranking and idle speeds because of the aforenoted factors which will permit a greater amount of fuel to be injected during the same crank angle because of the advanced injection timing.

Figure 2:
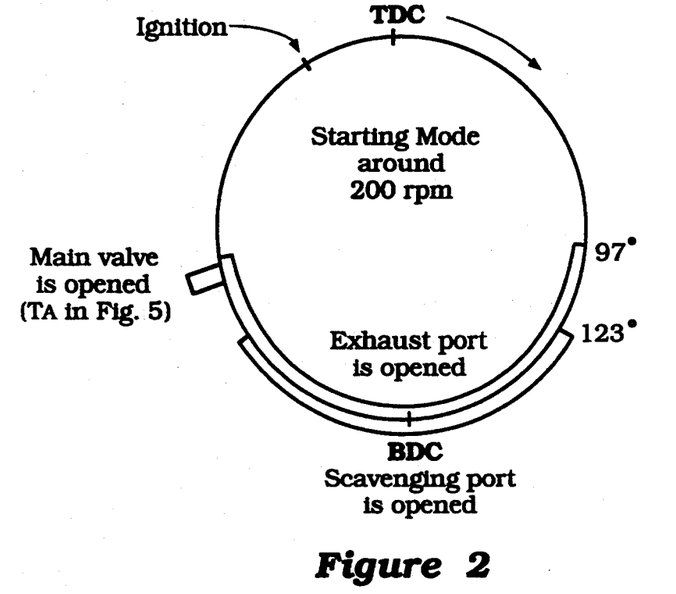
FIG. 2 is a timing diagram with respect to crankshaft rotational angle showing the opening and closing of the scavenge ports and exhaust ports, the timing of fuel injection and the timing of ignition during starting.
Figure 3:
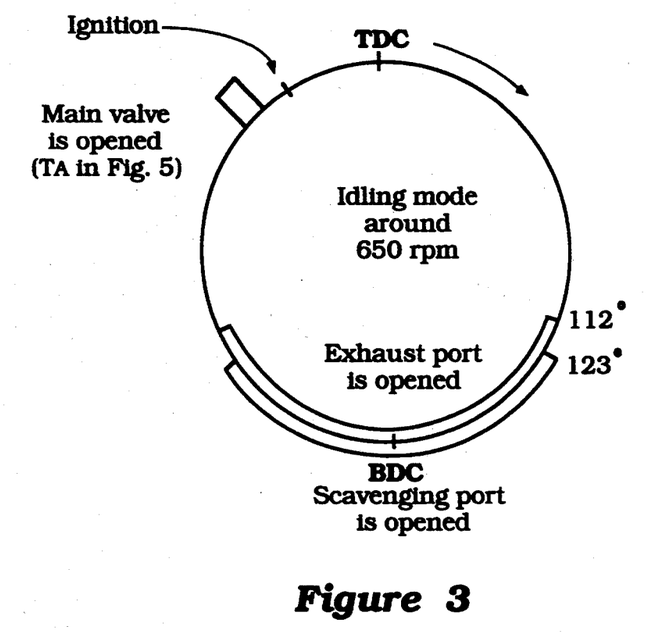
FIG. 3 is a timing chart, in part similar to FIG. 2, and shows the same conditions under normal idle condition.

At the same time the injection timing and duration are extended, the exhaust control valves 45 are positioned in their fully opened position during starting so as to change the exhaust port timing as also shown in FIGS. 2 and 3. This exhaust port timing is equivalent to that of full load and speed of the engine and thus provides an earlier exhaust port opening and a later exhaust port closing. In addition to reducing the effect of compression ration, this provides a longer scavenging period and will also permit easier starting.

Figure 5:
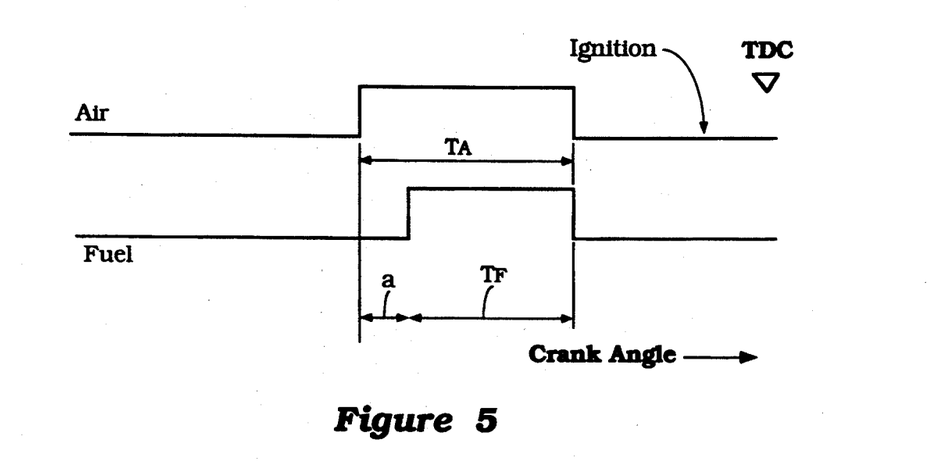
FIG. 5 is a timing chart in respect to crank angle and shows the timing of fuel injection and the timing of opening and closing of the injector valve under idle conditions with respect to a non-precharged type of fuel/air injector.

Air/fuel injectors fall into two general categories, the precharged type and the non-precharged type. FIG. 5 shows the typical injection timing pulses of a non-precharged type of fuel injector operating at idle. It should be noted that the main injection valve is open for the time $T_A$ and fuel injection from the fuel injectors 35 occurs over the time $T_F$ with the fuel injection timing being delayed by a crank angle of "a" after the injection valve has begun to open.

Figure 6:
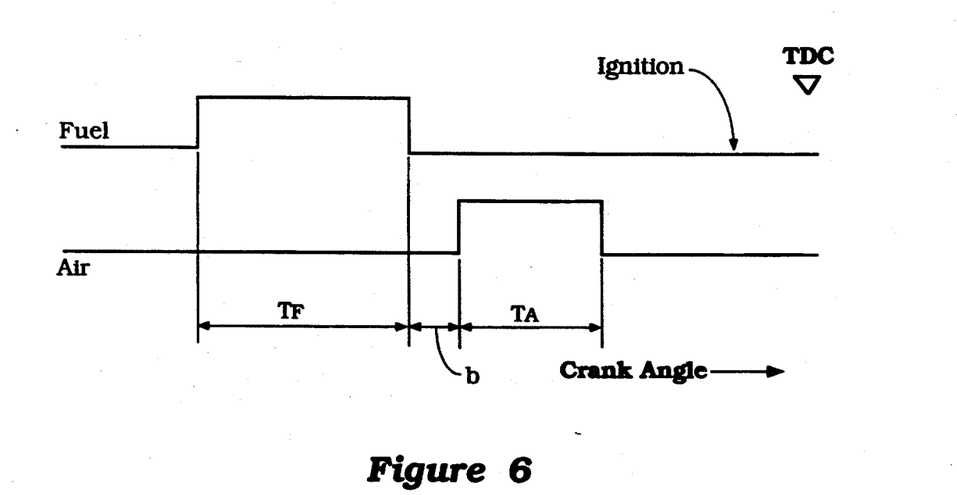
FIG. 6 is a timing chart, in part similar to FIG. 5, and shows the corresponding timing of a precharged type of fuel/air injector.

FIG. 6 shows a corresponding diagram for a precharged type of fuel injector wherein fuel in injected for the time period $T_F$ while the injection valve is still closed and then after a delay of crank angle "b" the injection valve is opened for the time $T_A$.

The invention can be employed with either type of control strategy. In either event, the injection timing is advanced during starting and the injection duration is also extended in real time. When referring to injection timing, reference is made primarily to the timing of opening of the injector valve of the air/fuel injector 33.

"Fuel injection duration" refers to the duration of time when fuel is injected by the fuel injector 35 regardless of whether a precharged or non-precharged type of fuel injector is employed. Hence, when the term "injection timing" is used in the specification and claims, this deals with the opening of the injector valve of the fuel/air injector 33 or the beginning of fuel injection if direct cylinder fuel injection is employed. "Fuel injection duration" refers to the duration of time when fuel is injected by the fuel injector 35. If direct cylinder injection without an air assist is used, this is to the total time when the injector 35 discharges. Of course, either of these expedients (timing advance or duration increase can be employed without the others). For optimum results, however, with many types of engines it is desirable to both advance the timing of opening of the injector valve and also the duration of fuel injection.

Figure 4:
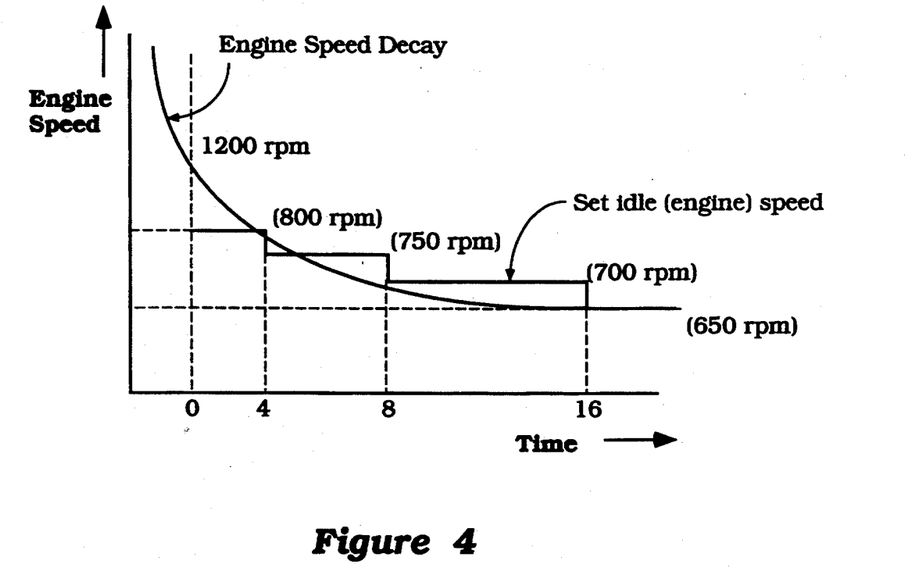
FIG. 4 is a timing chart showing engine speed in relation to time, in relation to a number of crankshaft revolutions, showing the return to idle from a racing mode condition in accordance with an embodiment of the invention.

In addition to the procedures employed for assisting starting, the engine 11 and specifically the control unit 49 provides a strategy for insuring good return of the engine to idle once the throttle has been closed from a racing condition. Such racing conditions are detected in a condition which will be noted and in accordance with this feature of the invention, the idle speed is reduced in steps to the desired idle speed under such a condition. FIG. 4 shows the return to idle from a racing condition when the engine is running at a speed of approximately 1200 rpm at the time the control begins. Rather than reducing the engine control parameters immediately to the desired idle speed of 650 rpm, the program moves to hold an idle speed of 800 rpm for a certain, relatively few number of crankshaft revolutions such as four (4). The program then steps the idle speed down to 750 rpm for an additional relatively low number of crankshaft revolutions, for example four (4) more revolutions or a total of eight (8) revolutions. The program then moves to a further reduced step of 700 rpm for a somewhat longer time period, such as an additional eight (8) engine revolutions (total of sixteen (16)) and then moves to the final idle speed of 650 rpm. By virtue of this control routine, it is possible to insure that the engine will return smoothly to idle and will not stall.

Figure 7:
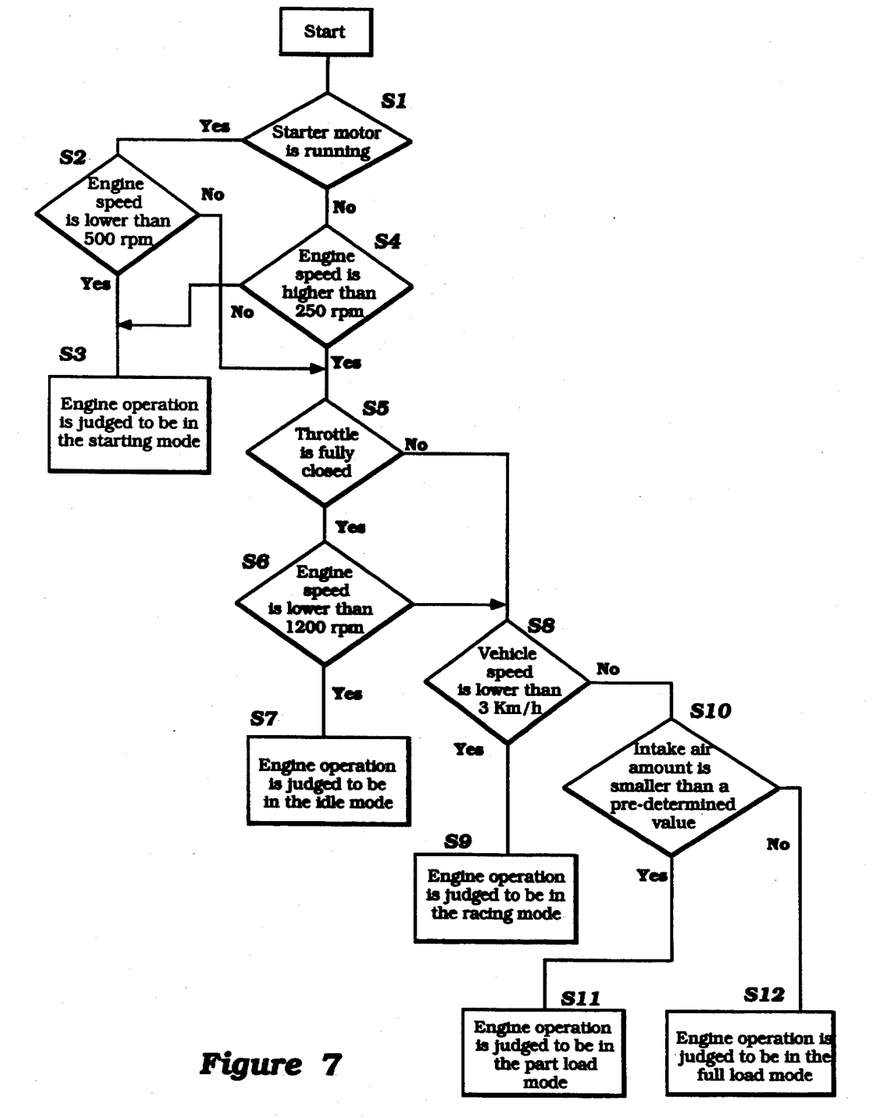
FIG. 7 is a block diagram showing the control routine for determining the engine running mode.

The control routine will now be further described by reference to FIG. 7 which shows the way in which the ECU 49 and specifically the engine operating condition discriminator 51 operates. When the program starts it moves to the step S1 to determine if the starter motor for the engine is being operated. If it is, the program moves to the step S2 to see if the engine speed is lower than 500 rpm. If so, it is assumed that the engine is in the starting mode and this determination is made at the step S3 so as to adjust the fuel injection duration and advance and also the position of the exhaust control valve 45 as aforenoted.

If at the step S1 it is determined that the starter motor is not being operated, the program then moves to the step S4 to determine if the engine speed is higher than 250 rpm. If it is not, the program again moves to the step S3 as a determination is made that the engine is still in its starting mode.

If, however, after the starter motor is determined to be operative at the step S1 and the engine speed is not lower than 500 rpm at step S2, or if the engine speed is higher than 250 rpm as determined at the step S4, the program moves to the step S5 to determine if the throttle is fully closed and it is assumed that starting has been completed.

If, at the step S5, it is determined that the throttle valve is fully closed, the program moves to the step S6 to determine if the engine speed is lower than 1200 rpm. If it is, the program moves to the step S7 wherein it is assumed that the engine is in its idle mode and idle control of the spark timing and injection timing and duration and exhaust control valve position are all initiated.

If the throttle has been determined to be not fully closed at the step S5 and if the engine speed is 1200 rpm or greater as determined at the step S6, the program moves to the step S8 to determine vehicle speed. If vehicle speed is lower than 3 kilometers per hour, the program determines that the engine is returning to idle from the racing mode and the program moves to step S9 to make that determination and to step the idle speed back down to the desired idle speed in accordance with the procedure set forth in FIG. 4.

Also, if it is determined at the step S5 that the throttle valve is not fully closed the program still moves to the step S8 and if the throttle valve is partially opened and the speed of the vehicle is greater than 3 kilometers per hour, it is again determined that the engine was in a racing condition and the return to idle mode of FIG. 4 is again set into place at the step S9.

If at the step S8 it is determined that the vehicle speed is higher than 3 kilometers per hour, the program then moves to the step S10 to determine the amount of intake air flowing into the system. This is sensed by an air flow detector or, alternatively, by crankcase pressure in any known manner. If the intake air is smaller than a predetermined amount, the program then moves to the step S11 and determines that the engine is in the part load mode. If, however, at the step S10 it is determined that the engine air flow is not smaller than a predetermined value, then the program then moves to the step S12 to determine that the engine is in a full load mode.

It should be readily apparent that the described construction provides good starting and ease of return to idle from a racing condition without stalling. The foregoing description is that of preferred embodiments of the invention and various changes and modifications may be made without departing from the spirit and scope of the invention, as defined by the appended claims.

I claim:

1. An internal combustion engine having a pair of relatively moveable components defining a combustion chamber, fuel injection means for injecting fuel directly into said combustion chamber, control means for controlling the operation of said fuel injection means, means for starting of said engine, means responsive to starting of said engine for advancing the time of injection of fuel into said combustion chamber by said fuel injector and means for returning the engine speed in incremental speed reduction steps to idle speed at the completion of a racing mode with the time period between the steps being increased as the actual engine speed approaches the idle speed.

2. An internal combustion engine as set forth in claim 1 wherein each of the steps comprises a few number of crankshaft revolutions and the number of revolutions in each step is gradually increased with time until the actual idle speed is reached.

3. An internal combustion engine as set forth in claim 1 further including means for determining when the engine has been in a racing mode for initiating the operation of the means for returning the engine speed in steps to idle speed.

4. An internal combustion engine as set forth in claim 3 wherein the means for determining when the engine has been in a racing mode and is being returned to idle speed compares the engine speed with the speed of a vehicle driven by the engine, and if the engine speed is high and the vehicle speed is low it is determined that the engine is being returned to an idle speed from a racing mode.

5. A method of operating an internal combustion engine to return to a normal idle speed at the completion of a racing condition comprising the steps of sensing a racing condition of the engine by comparing engine speed with the speed of a vehicle driven by the engine and determining that a racing condition exists if the engine speed is high and the vehicle speed is low, sensing a return of the throttle of the engine to an idle condition after racing, and reducing the targeted idle speed of the engine in response to the sensed conditions in steps to the normal idle speed.

6. A method of operating an internal combustion engine for returning to a normal idle speed at the completion of a racing condition comprising the steps of sensing a racing condition of the engine, sensing a return of the throttle of the engine to an idle condition after racing, and reducing the targeted speed of the engine to the normal idle speed in response to the sensed conditions in steps by reducing the targeted engine speed in gradual increments during a short time period with the time period between steps being increased as the engine speed approaches the normal idle speed.

7. A method as set forth in claim 6 wherein the time periods comprise a few number of crankshaft revolutions with the number of revolutions of each step being increased as the engine speed approaches normal idle speed.

* * * * *